Figure 1:
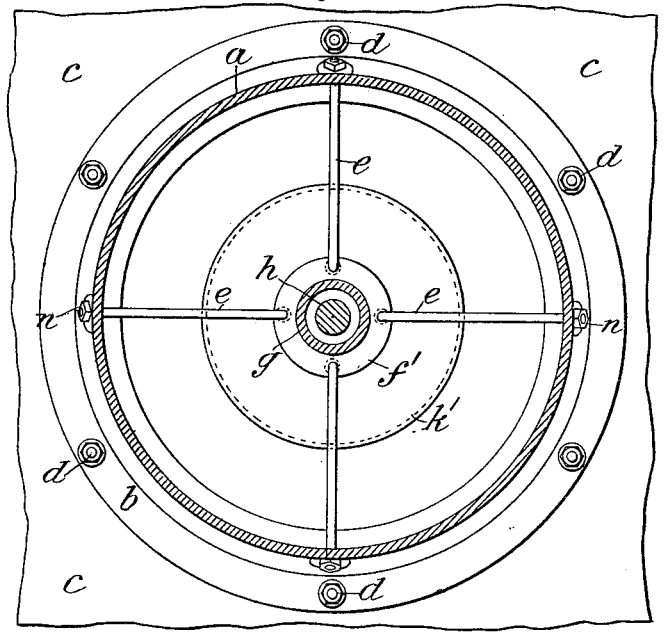

No. 630,529. Patented Aug. 8, 1899.
S. C. DAVIDSON.
MEANS FOR SUPPORTING BEARINGS.
(Application filed Oct. 4, 1898.)
(No Model.) 3 Sheets—Sheet 1.

WITNESSES:
Fred White
Thomas F. Wallace

INVENTOR:
Samuel Cleland Davidson,
By his Attorneys,

No. 630,529. Patented Aug. 8, 1899.
S. C. DAVIDSON.
MEANS FOR SUPPORTING BEARINGS.
(Application filed Oct. 4, 1898.)

(No Model.) 3 Sheets—Sheet 2.

WITNESSES:
Fred White
Thomas F. Wallace

INVENTOR:
Samuel Cleland Davidson,
By his Attorneys,
Arthur C. Fraser & Co.

No. 630,529. Patented Aug. 8, 1899.
S. C. DAVIDSON.
MEANS FOR SUPPORTING BEARINGS.
(Application filed Oct. 4, 1898.)
(No Model.) 3 Sheets—Sheet 3.

WITNESSES:
Fred White
Thomas F. Wallace

INVENTOR:
Samuel Cleland Davidson,
By his Attorneys,
Arthur C. Fraser & Co.

UNITED STATES PATENT OFFICE.

SAMUEL CLELAND DAVIDSON, OF BELFAST, IRELAND.

MEANS FOR SUPPORTING BEARINGS.

SPECIFICATION forming part of Letters Patent No. 630,529, dated August 8, 1899.

Application filed October 4, 1898. Serial No. 692,587. (No model.)

*To all whom it may concern:*

Be it known that I, SAMUEL CLELAND DAVIDSON, merchant, of Belfast, Ireland, have invented certain new and useful Improvements in Means for Supporting the Bearings of Spindles or Shafts in Wall Brackets or Frames, of which the following is a specification.

My invention has reference more particularly to means for supporting and securing the bearings of spindles or shafts in wall brackets or frames when the said spindles or shafts have their ends overhanging and projecting from one or both ends of the bearings, so that a fan, pulley, or crank may be mounted thereon without (or it may be with) exterior support from other bearings, as in the case either of fans attached to or within walls or partitions for moving air or other fluid through an orifice or opening therein for ventilating or such like purposes or for supporting and securing the bearings of a bracket for carrying a counter-shaft having pulleys or cranks mounted on the projecting ends; and the objects, among others, of my invention are to so construct said wall brackets or frames and to support the bearings therein that said bearings shall be thoroughly rigid and firm and the bracket as a whole light and simple to make and that the obstruction by the brackets or frames to the passage of air or other fluids shall be as little as possible.

According to my invention the bearing in which the spindle or shaft rotates is secured within a wall bracket or frame, which may be in the form of a ring or of a triangular, rectangular, or polygonal frame, by means of two sets of wire or other stays, which are extended from straining attachments in the bracket to the bearing, to which they are connected at or near to each end of the same and operate thereon by tensile strain in such manner that the tension of said stays tends to draw the ends of the bearing toward one another and to put the intermediate portion of the bearing under compression, like as in an ordinary bicycle-wheel the tension of the wire spoke operates from the rim upon the hub.

The bracket has suitable flanges or arms whereby it may be attached by bolts or otherwise to a wall or partition or to a ceiling or floor; but if the bracket be built into a wall these flanges may not be required. The tightening of the stays is provided for by having their outer ends screwed and passed through suitably-located holes in the bracket, nuts being mounted thereon, so that by tightening same on the outer side of the bracket the ends of the bearing can be adjusted into proper position and any required tension given thereto for holding them in said position with sufficient firmness and rigidity.

For lightness of construction, as well as for durability and lubrication, the bearing may be made of two bearings proper connected together by an intermediate tube or pipe.

Figure 4:
Figure 2:
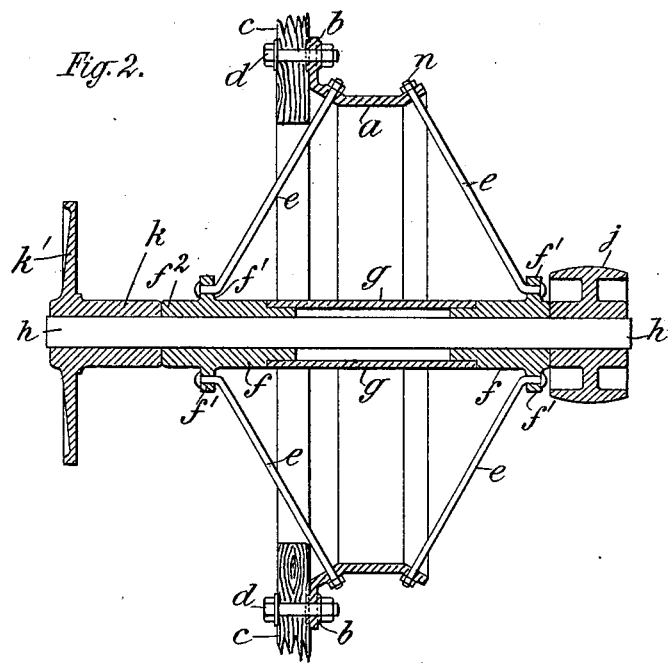
Figure 5:
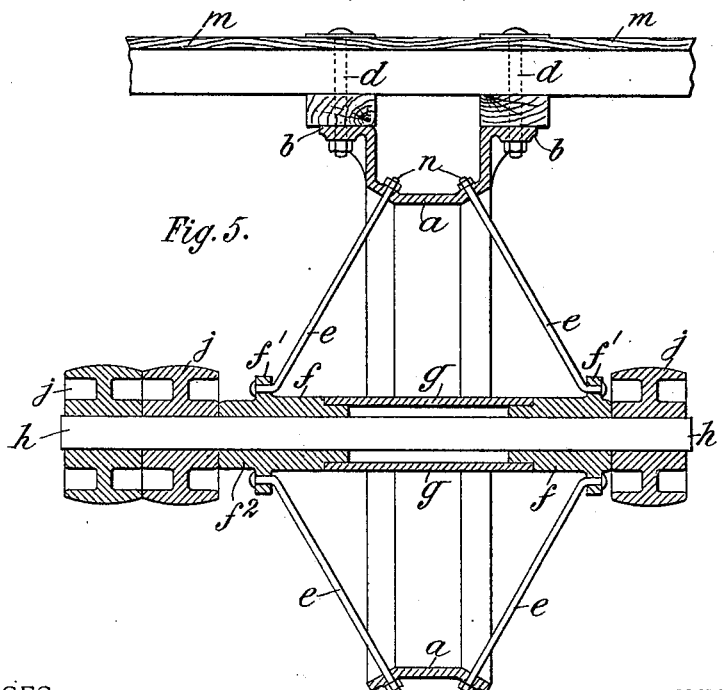
Figure 3:
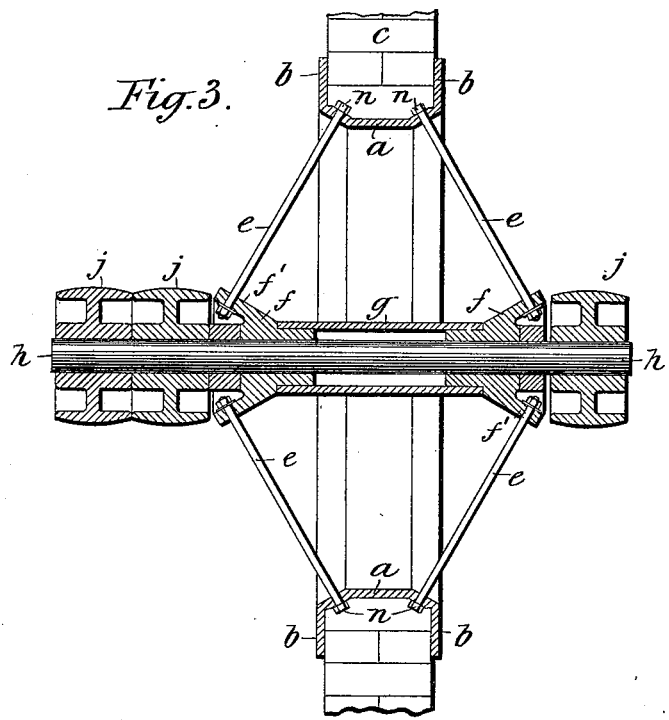
Figure 6:
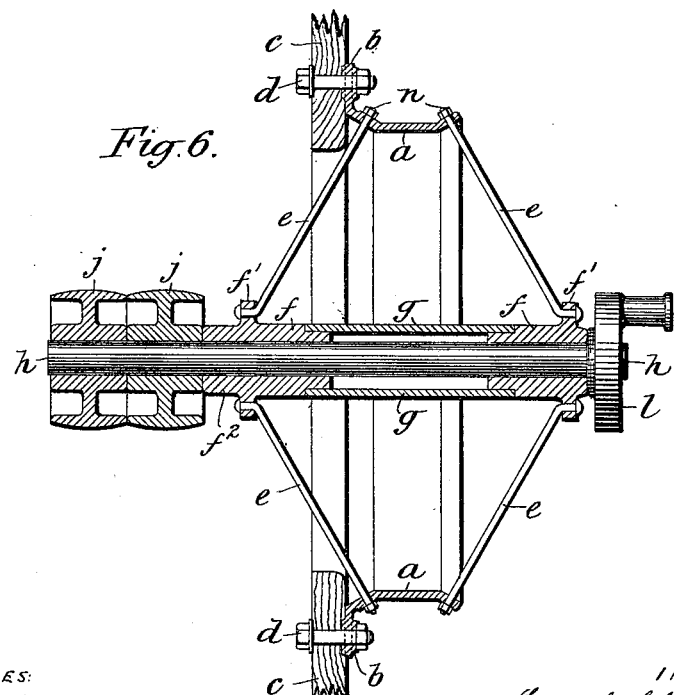

In the accompanying drawings, Figures 1 and 2 are vertical sections, taken at right angles to each other, illustrating my improved means for supporting the bearings of a spindle or shaft in a wall bracket or frame attached to a partition or wall and showing its adaptation in the mounting of ventilating-fans which are employed for exhausting the fluid operated on through an orifice in said partition and discharging it on the opposite side thereof. Fig. 3 is a mid-longitudinal section illustrating the application of my said means in the case of a wall bracket or frame built into a wall and showing its adaptation in the form of a bracket for a counter-shaft mounted with pulleys. Figs. 4 and 5 are respectively an end elevation and a mid-longitudinal section illustrating the application of my said means in the case of a bracket or frame attached to a floor or ceiling and showing its adaptation as a bracket for a counter-shaft mounted with pulleys. Fig. 6 is a mid-longitudinal section illustrating the application of my said means in the case of a wall bracket or frame attached to a partition and showing its adaptation as a bracket for a counter-shaft, with pulleys and crank mounted on the respective projecting ends.

Referring first to Figs. 1 and 2, $a$ represents the wall bracket or frame. $b$ is a flange on said bracket, by which it is attached to the partition or wall $c$ by bolts $d$. $h$ is the spindle or shaft on which the pulley $j$ and ventilating-fan hub $k$ are mounted. $k'$ represents a disk on which fan-blades may be mounted. $f\,g\,f$ represent the bearing for the spindle or shaft $h$. This bearing may be made in one piece; but for lightness of construction, as well as for durability and lubrication, it is preferred to make it as shown—that is to say, of two bearings $ff$ at the respective ends and an intermediate tube $g$, connecting same together. $e\ e$ are wire or other stays connecting the bearing at or near its ends to the bracket $a$. The inner ends of these stays are not connected to the bearing itself, but to flanges or projections $f'$ thereon. The outer ends of said stays pass through holes in the bracket $a$ and are fitted with nuts $n$, by which they can be strained to the required extent. The stays are always in tension, and therefore tend to draw the ends of the bearing toward one another and to put the intermediate parts of the bearing under compression. The number of the stays is optional so long as there are not less than three connected to each end of the bearing. The drawings show four stays at each end, which is a suitable number in ordinary cases. The distance apart of the attachment of the two sets of stays to the bearing measured parallel to the axis of the spindle should be greater than the distance apart of their attachment to the bracket $a$. The bearing is shown projecting at $f^2$ some distance beyond the flange $f'$, to which the stays $e$ are attached, for the purpose of giving support to the shaft $h$ when it has to be considerably extended toward the disk $k'$.

In Fig. 3, which shows the invention applied in the case of a bracket $a$, built into a wall $c$, for a counter-shaft $h$, mounted with pulleys $j\ j$ at both sides of the bracket, the flanges $f'$, to which the stays $e$ are attached, are shown as being at an angle with the bearing.

In Figs. 4 and 5, $m$ represents the ceiling or floor, to which the bracket $a$ is attached by the bolts $d$ passing through the flanges $b$ of said bracket.

In Fig. 6, $l$ represents a crank mounted on one of the projecting ends of the counter-shaft $h$, and $j\ j$ are pulleys on the other projecting end.

It will be seen that in all the constructions shown the brackets and stays offer very little obstruction to the passage of air or other fluid, which is of great importance in the case of ventilating-fans.

What I claim, and desire to secure by Letters Patent, is—

1. In shaft-hangers and the like, the combination with a bracket or frame, of an approximately centrally-located bearing carried thereby for a spindle or shaft, said bearing being encompassed by said bracket, and two sets of stays respectively connecting said bearing to said bracket, said stays being in tension, and the distance apart of the attachment of said two sets of stays to said bearing in its axial direction being greater than the distance apart of their attachment to said bracket, whereby they exert both an approximately radial and an axial tension relatively to the bearing in holding it and the bracket together, substantially as set forth.

2. The combination of the bracket $a$, shaft or spindle bearing $f$, flanges $f'$, stays $e$ connecting said flanges with said bracket and exerting a tension against said parts in the direction of the axis of the bearing, and straining attachments $n$ for putting said stays in tension, substantially as set forth and shown.

In witness whereof I have hereunto signed my name in the presence of two subscribing witnesses.

SAMUEL CLELAND DAVIDSON.

Witnesses:
GEORGE E. WARD,
HUGH T. COULTER.